US011411426B2

(12) United States Patent
Ono et al.

(10) Patent No.: US 11,411,426 B2
(45) Date of Patent: Aug. 9, 2022

(54) CHARGING CONTROL FOR IMPROVING EFFICIENCY OF CHARGING AUXILIARY DEVICE BATTERY (71) Applicant: TOYOTA JIDOSHA KABUSHIKI KAISHA, Toyota (JP)

(72) Inventors: Toru Ono, Toyota (JP); Akira Umemoto, Nagakute (JP); Takuya Itoh, Toyota (JP); Tomoyuki Kato, Miyoshi (JP); Makoto Fujii, Obu (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 165 days.

(21) Appl. No.: 16/727,990

(22) Filed: Dec. 27, 2019

(65) Prior Publication Data
US 2020/0262310 A1 Aug. 20, 2020

(30) Foreign Application Priority Data

Feb. 20, 2019 (JP) .............................. JP2019-028916

(51) Int. Cl.
H02J 7/00 (2006.01)
H02J 7/34 (2006.01)
B60L 58/13 (2019.01)
B60R 16/033 (2006.01)
B60L 1/00 (2006.01)

(52) U.S. Cl.
CPC ............ *H02J 7/342* (2020.01); *B60L 58/13* (2019.02); *B60R 16/033* (2013.01); *H02J 7/007192* (2020.01); *H02J 7/007194* (2020.01); *B60L 1/00* (2013.01); *B60L 2210/10* (2013.01); *B60L 2240/36* (2013.01); *B60L 2240/545* (2013.01); *B60Y 2300/91* (2013.01)

(58) Field of Classification Search
CPC ................. H02J 7/342; H02J 7/007192; H02J 7/007194; H02J 7/1423; B60L 58/13; B60L 1/00; B60L 2240/545; B60L 2240/36; B60L 2210/10; B60R 16/033; B60Y 2300/91
See application file for complete search history.

(56) References Cited

U.S. PATENT DOCUMENTS 5,698,967 A * 12/1997 Baer ...................... H02J 7/0018
320/152
6,943,525 B2 * 9/2005 Toya ....................... B60L 58/14
320/104
7,267,090 B2 * 9/2007 Tamai ................. B60W 30/192
123/179.3

(Continued)

FOREIGN PATENT DOCUMENTS

CN 109606203 B * 6/2020 ............ B60L 3/0023
DE 102016108358 A1 * 6/2017 ................ B60L 1/00

(Continued)

Primary Examiner — Naum Levin
(74) Attorney, Agent, or Firm — Oliff PLC (57) ABSTRACT A charging control device includes: a determination section configured to make a determination as to whether an auxiliary device battery that supplies electric power to auxiliary devices of a vehicle is within a predetermined first temperature range; and a control section configured to, in a case in which the auxiliary device battery is within the first temperature range, cause a charging section to charge the auxiliary device battery.

8 Claims, 6 Drawing Sheets

(56) References Cited

U.S. PATENT DOCUMENTS

| | | | | |
|---|---|---|---|---|
| 7,609,033 | B2* | 10/2009 | Sasaki | B60L 58/16 320/150 |
| 8,189,305 | B2* | 5/2012 | Newman | B60R 16/033 361/18 |
| 8,305,043 | B2* | 11/2012 | Yamamoto | G01R 19/0084 320/150 |
| 8,564,241 | B2* | 10/2013 | Masuda | H02J 7/00309 320/104 |
| 8,742,615 | B2* | 6/2014 | Gopalakrishnan | B60L 58/20 307/9.1 |
| 8,917,058 | B2* | 12/2014 | Hirai | H02J 7/1423 320/112 |
| 8,928,272 | B2* | 1/2015 | Song | B60L 1/02 320/104 |
| 9,168,834 | B2* | 10/2015 | Yashiro | B60L 58/12 |
| 9,725,007 | B2* | 8/2017 | Hashimoto | B60L 58/25 |
| 10,099,567 | B2* | 10/2018 | Hernandez Cervantes | B60L 58/15 |
| 10,118,501 | B2* | 11/2018 | Kim | B60L 58/21 |
| 10,493,977 | B2* | 12/2019 | Jang | F02N 11/04 |
| 10,538,175 | B2* | 1/2020 | Lee | B60W 10/06 |
| 10,543,757 | B2* | 1/2020 | Diab | B60L 1/00 |
| 10,611,258 | B2* | 4/2020 | Symanow | B60K 6/28 |
| 10,840,527 | B2* | 11/2020 | Tanaka | H01M 8/04626 |
| 10,981,559 | B2* | 4/2021 | Kim | B60K 6/485 |
| 2007/0233357 | A1* | 10/2007 | Sugai | F02D 25/04 701/105 |
| 2010/0244782 | A1* | 9/2010 | Nagayama | H02J 7/0032 320/162 |
| 2011/0163716 | A1* | 7/2011 | Gale | B60L 3/04 320/109 |
| 2011/0204844 | A1* | 8/2011 | Adames | H02J 7/342 320/107 |
| 2015/0283915 | A1* | 10/2015 | Kim | H02J 7/342 320/104 |
| 2018/0134176 | A1* | 5/2018 | Symanow | B60L 58/12 |
| 2018/0345798 | A1* | 12/2018 | Sakakibara | B60L 1/02 |
| 2020/0086732 | A1* | 3/2020 | Bargman | B60K 6/48 |
| 2020/0124673 | A1* | 4/2020 | Heo | H02M 3/156 |
| 2020/0282853 | A1* | 9/2020 | Paryani | B60L 58/15 |
| 2021/0094441 | A1* | 4/2021 | Sampson | B60K 1/02 |
| 2021/0278470 | A1* | 9/2021 | Cyrne | G01R 31/371 |

FOREIGN PATENT DOCUMENTS

| | | | |
|---|---|---|---|
| JP | 2006-174619 | A | 6/2006 |
| JP | 2007168477 | A * | 7/2007 |
| JP | 2008086060 | A * | 4/2008 |
| JP | 2017-005830 | A | 1/2017 |
| JP | 2017-158252 | A | 9/2017 |
| JP | 2018-033256 | A | 3/2018 |

* cited by examiner

CHARGING CONTROL FOR IMPROVING EFFICIENCY OF CHARGING AUXILIARY DEVICE BATTERY

CROSS-REFERENCE TO RELATED APPLICATION

This application claims priority under 35 USC 119 from Japanese Patent Application No. 2019-028916, filed on Feb. 20, 2019, the disclosure of which is incorporated by reference herein.

BACKGROUND

Technical Field

The present disclosure relates to a charging control device and a charging control method.

Related Art

Japanese Patent Application Laid-Open (JP-A) No. 2006-174619 discloses the technique of charging an auxiliary device battery by the electric power of a main battery in a case in which, when a given time period elapses from the ignition switch of a vehicle being set in an OFF state, a charging control device is activated, and it is determined that the charged amount of the auxiliary device battery is less than or equal to a predetermined value.

The efficiency at the time of charging an auxiliary device battery is affected by the temperatures of the auxiliary device battery and the like. However, the temperatures of the auxiliary device battery and the like at the time of charging the auxiliary device battery are not taken into consideration in the technique disclosed in JP-A No. 2006-174619. Therefore, in the technique of JP-A No. 2006-174619, the efficiency of charging decreases in cases in which the temperatures of the auxiliary device battery and the like at the time of charging the auxiliary device battery are too high or too low.

SUMMARY

The present disclosure provides a charging control method and a charging control device that may improve the efficiency of charging an auxiliary device battery.

A first aspect of the present disclosure is a charging control device including: a determination section configured to make a determination as to whether an auxiliary device battery that supplies electric power to auxiliary devices of a vehicle is within a predetermined first temperature range; and a control section configured to, in a case in which the auxiliary device battery is within the first temperature range, cause a charging section to charge the auxiliary device battery.

In the first aspect of the present disclosure, in a case in which it is at least determined that the auxiliary device battery is within a first temperature range, the charging section is made to carry out charging of the auxiliary device battery. Therefore, the first aspect of the present disclosure may improve the efficiency of charging the auxiliary device battery.

In a second aspect of the present disclosure, in the first aspect, the determination section may also make a determination as to whether the auxiliary device battery and the charging section are respectively within the first temperature range, and in a case in which it is determined that the auxiliary device battery and the charging section are respectively within the first temperature range, the control section may cause the charging section to charge the auxiliary device battery.

The efficiency at the time of charging the auxiliary device battery is, more specifically, affected also by the temperature of the charging section that charges the auxiliary device battery. In the second aspect of the present disclosure, in a case in which it is determined that the auxiliary device battery and the charging section respectively are within the first temperature range, the charging section is made to carry out charging of the auxiliary device battery. Therefore, the efficiency of charging the auxiliary device battery decreasing due to the charging section not being in the first temperature range may be suppressed.

In a third aspect of the present disclosure, in the first or second aspect, the determination section may also make a determination as to whether a high-voltage battery, which has a higher voltage than the auxiliary device battery, is within a predetermined second temperature range, and in a case in which it is determined at least that the auxiliary device battery is within the first predetermined temperature range, and it is determined that the high-voltage battery is within the second temperature range, the control section may cause the charging section to charge from the high-voltage battery to the auxiliary device battery.

The efficiency in a case of charging the auxiliary device battery from the high-voltage battery is affected also by the temperature of the high-voltage battery. In the third aspect of the present disclosure, in a case in which it is at least determined that the auxiliary device battery is within the first temperature range, and it is determined that the high-voltage battery is within the second temperature range, the charging section is made to carry out charging from the high-voltage battery to the auxiliary device battery. Therefore, in a case in which the auxiliary device battery is charged from the high-voltage battery, the efficiency of charging the auxiliary device battery deteriorating due to the high-voltage battery not being within the second temperature range may be suppressed.

In a fourth aspect of the present disclosure, in any one of the first through third aspects, the control section may estimate a time period, which ends when a charged amount of the auxiliary device battery becomes less than a predetermined first threshold value, as a first predetermined time period, and in a case in which the first predetermined time period has elapsed after an ignition switch of the vehicle is turned OFF, and the charged amount of the auxiliary device battery is less than the first threshold value, the control section may cause the determination section to make the determination.

In the fourth aspect of the present disclosure, the determination by the determination section is not carried out and charging of the auxiliary device battery is not carried out from the ignition switch of the vehicle being turned OFF until a time period (the first predetermined time period), in which it is estimated that the charged amount of the auxiliary device battery will fall to less than the first threshold value, elapses and the charged amount of the auxiliary device battery falls to less than the first threshold value. Therefore, charging of the auxiliary device battery being carried out more frequently than needed may be suppressed.

In a fifth aspect of the present disclosure, in any one of the first through fourth aspects, in a case in which the charged amount of the auxiliary device battery is less than a first threshold value, the control section may cause the determination section to make the determination, and in a case in which the determination is affirmative, the control section may cause the charging section to charge the auxiliary device battery.

In the fifth aspect of the present disclosure, in a case in which the charged amount of the auxiliary device battery is less than the first threshold value and the determination of the determination section is affirmative, the charging section is made to carry out charging of the auxiliary device battery. Therefore, charging of the auxiliary device battery may be carried out in a state in which the auxiliary device battery is a charged amount that is suitable for charging.

In a sixth aspect of the present disclosure, in any one of the first through fifth aspects, in a case in which a charged amount of the auxiliary device battery is greater than or equal to a predetermined first threshold value, the control section may estimate a first predetermined time period which is a time period until the charged amount of the auxiliary device battery will fall to less than the first threshold value, and in a case in which the first predetermined time period elapses and the charged amount of the auxiliary device battery is less than the first threshold value, the control section may cause the determination section to make the determination.

In the sixth aspect of the present disclosure, in a case in which the charged amount of the auxiliary device battery is greater than or equal to the first threshold value, the determination by the determination section is not carried out and charging of the auxiliary device battery is not carried out until the time period (the first predetermined time period), which is until the charged amount of the auxiliary device battery falls to less than the predetermined first threshold value, elapses and the charged amount of the auxiliary device battery falls to less than the first threshold value. Therefore, charging of the auxiliary device battery being carried out more frequently than needed may be suppressed.

In a seventh aspect of the present disclosure, in any one of the first through sixth aspects, in a case in which the determination is negative, and in a case in which a charged amount of the auxiliary device battery is less than a predetermined second threshold value, the control section may cause the charging section to charge the auxiliary device battery.

In the seventh aspect of the present disclosure, even in a case in which the determination of the determination section is negative, charging of the auxiliary device battery is made to be carried out if the charged amount of the auxiliary device battery is less than the second threshold value. Therefore, the charged amount of the auxiliary device battery may be prevented from becoming 0 or a state near 0.

In an eighth aspect of the present disclosure, in any one of the first through seventh aspects, in a case in which the determination is negative, and in a case in which a charged amount of the auxiliary device battery is greater than or equal to a second threshold value, the control section may cause the determination section to make the determination after a second predetermined time period elapses.

In the eighth aspect of the present disclosure, in a case in which the determination of the determination section is negative, if the charged amount of the auxiliary device battery is greater than or equal to the second threshold value, the determination by the determination section is made to be carried out after the second predetermined time period elapses. Therefore, by setting in advance a time period, in which it is estimated that a change in air temperature will arise, as the second predetermined time period, the probability that at least the auxiliary device battery will be determined to be within the predetermined temperature range in the determination of the next time by the determination section may be increased.

In a ninth aspect of the present disclosure, in any one of the fourth, sixth and eighth aspects, on the basis of predicted data that expresses results of prediction of a transition in air temperature, the control section may correct the first predetermined time period or the second predetermined time period to a time period in which it is predicted that the auxiliary device battery will be in the predetermined temperature range after the first predetermined time period or the second predetermined time period.

In the ninth aspect of the present disclosure, the first predetermined time period or the second predetermined time period is corrected on the basis of the predicted data that expresses the results of prediction of the transition in the air temperature. Therefore, after the first predetermined time period or the second predetermined time period elapses, the probability that it will be determined by the determination section to be within the predetermined temperature range may be increased more.

A tenth aspect of the present disclosure is a charging control method including: determining whether an auxiliary device battery that supplies electric power to auxiliary devices of a vehicle is within a predetermined first temperature range; and in a case in which at least that the auxiliary device battery is within the first temperature range, causing a charging section to charge the auxiliary device battery.

In the same way as in the first aspect, in the tenth aspect of the present disclosure, the efficiency of charging the auxiliary device battery may be improved.

In accordance with the above-described aspects, the charging control device and charging control method of the present disclosure may improve the efficiency of charging an auxiliary device battery.

BRIEF DESCRIPTION OF THE DRAWINGS

Exemplary embodiments will be described in detail based on the following figures, wherein.

DETAILED DESCRIPTION

Examples of exemplary embodiments of the present disclosure are described in detail hereinafter with reference to the drawings.

First Exemplary Embodiment

Figure 1:
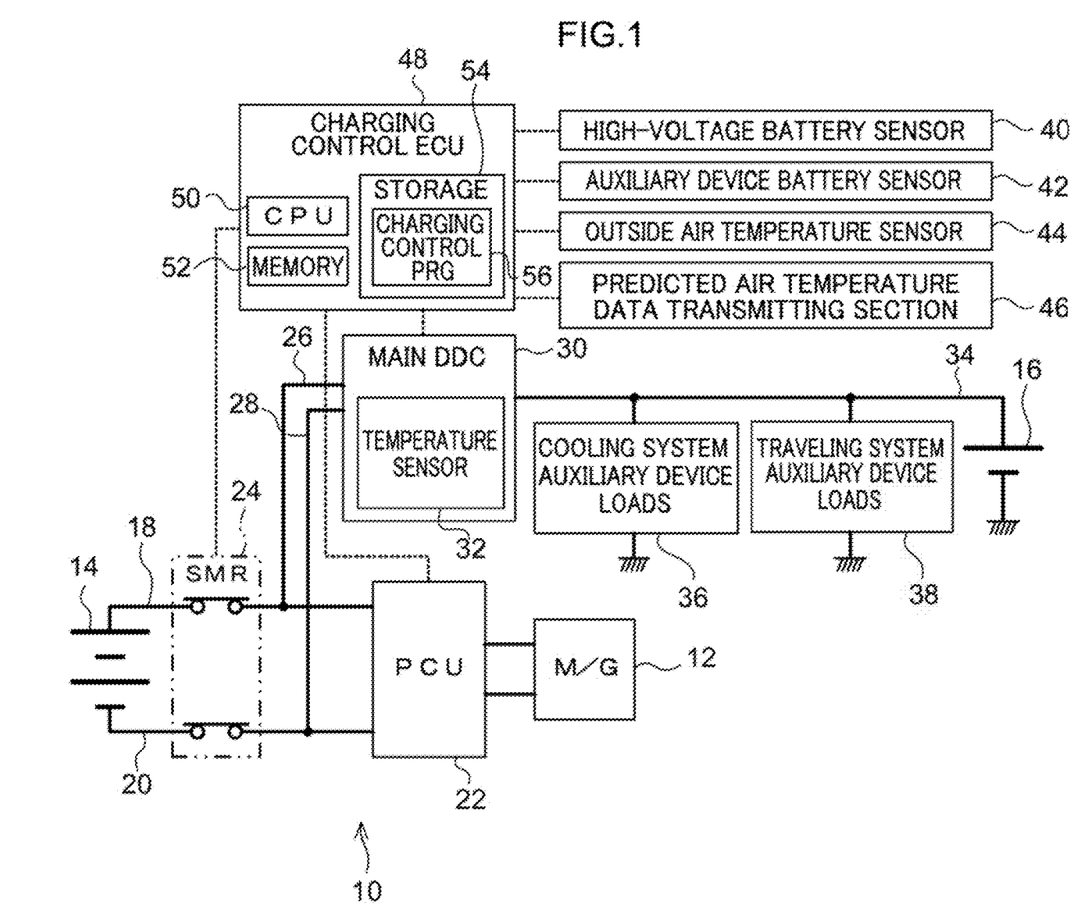
FIG. 1 is a schematic structural drawing of an onboard system relating to a first exemplary embodiment.

A vehicle, in which an onboard system 10 shown in FIG. 1 is installed, is a so-called hybrid vehicle in which are installed a motor generator (hereinafter called "MG") 12 that operates as a motor that causes the vehicle to travel and operates as a generator, a high-voltage battery 14, and an auxiliary device battery 16 that is lower voltage than the high-voltage battery 14.

The high-voltage battery 14 is connected via electrical wires 18, 20 to a power control unit (hereinafter called "PCU") 22. The MG 12 is connected to the PCU 22. The PCU 22 includes an inverter that converts AC electric power to DC electric power, and can convert DC electric power to AC electric power. In a case in which the MG 12 operates as a motor, electric power is supplied from the high-voltage battery 14 via the PCU 22 to the MG 12. In a case in which the MG 12 operates as a generator, the electric power generated at the MG 12 is supplied via the PCU 22 to the high-voltage battery 14, and the high-voltage battery 14 is thereby charged.

A high-voltage battery sensor 40 is added to the high-voltage battery 14. The high-voltage battery sensor 40 detects an SOC (State of Charge) value that expresses the charged state of the high-voltage battery 14, and detects the temperature of the high-voltage battery 14. A system main relay (hereinafter called "SMR") 24 is provided on the electrical wires 18, 20. The SMR 24 is turned OFF in a case in which it is sensed that an abnormality has arisen at the high-voltage battery 14, and, due thereto, the high-voltage battery 14 is cut-off from the onboard system 10.

Electrical wires 26, 28 branch off from the electrical wires 18, 20, and these electrical wires 26, 28 are connected to a main DC/DC converter (hereinafter called "main DDC") 30. The main DDC 30 is connected via an electrical wire 34 to the auxiliary device battery 16. Cooling system auxiliary device loads 36 and traveling system auxiliary device loads 38 are respectively connected to the electrical wire 34.

Examples of the cooling system auxiliary device loads 36 are a fan that blows air out toward and cools the high-voltage battery 14, a water pump that supplies cooling water to the inverter of the PCU 22, and the like. Examples of the traveling system auxiliary device loads 38 are an engine ECU (Electronic Control Unit) that controls operation of the engine, an injector that injects fuel into the engine, various types of actuators that are mounted to the engine, and the like.

The auxiliary device battery 16 supplies electric power to the cooling system auxiliary device loads 36 and the traveling system auxiliary device loads 38. Further, in a case in which the engine is operating, the auxiliary device battery 16 is charged due to electric power being supplied to the auxiliary device battery 16 from a generator (not shown) that is added to the engine. Further, in a case in which the ignition switch of the vehicle is OFF and a predetermined condition is met, electric power is supplied from the high-voltage battery 14 via the electrical wires 18, 20, 26, 28 to the main DDC 30, and electric power, whose voltage has been lowered by the main DDC 30, is supplied via the electrical wire 34 to the auxiliary device battery 16, and the auxiliary device battery 16 is thereby charged.

An auxiliary device battery sensor 42 is added to the auxiliary device battery 16. The auxiliary device battery sensor 42 detects the SOC value of the auxiliary device battery 16, and detects the temperature of the auxiliary device battery 16. Further, the main DDC 30 has built therein a temperature sensor 32 that detects the temperature of the main DDC 30. The SOC value of the auxiliary device battery 16 is an example of the charged amount of the auxiliary device battery.

The high-voltage battery sensor 40 and the auxiliary device battery sensor 42 are connected to a charging control ECU 48. The charging control ECU 48 has a CPU 50, a memory 52, and a non-volatile storage 54 that stores a charging control program 56. The PCU 22, the SMR 24, the DDC 30, an outside air temperature sensor 44 and a predicted air temperature data transmitting section 46 are connected to the charging control ECU 48. Note that the predicted air temperature data transmitting section 46 transmits predicted air temperature data that expresses the results of predicting the transition in the air temperature from here on.

The charging control ECU 48 carries out charging control processing that is described later, due the charging control program 56 being read-out from the storage 54 and being expanded in the memory 52, and the charging control program 56 that is expanded in the memory 52 being executed by the CPU 50. Operations of the PCU 22, the SMR 24 and the main DDC 30 are controlled by the charging control ECU 48.

Note that the charging control ECU 48 is an example of the determination section and the control section. The electrical wires 18, 20, 26, 28, 34 and the main DDC 30 are examples of the charging section.

Figure 2:
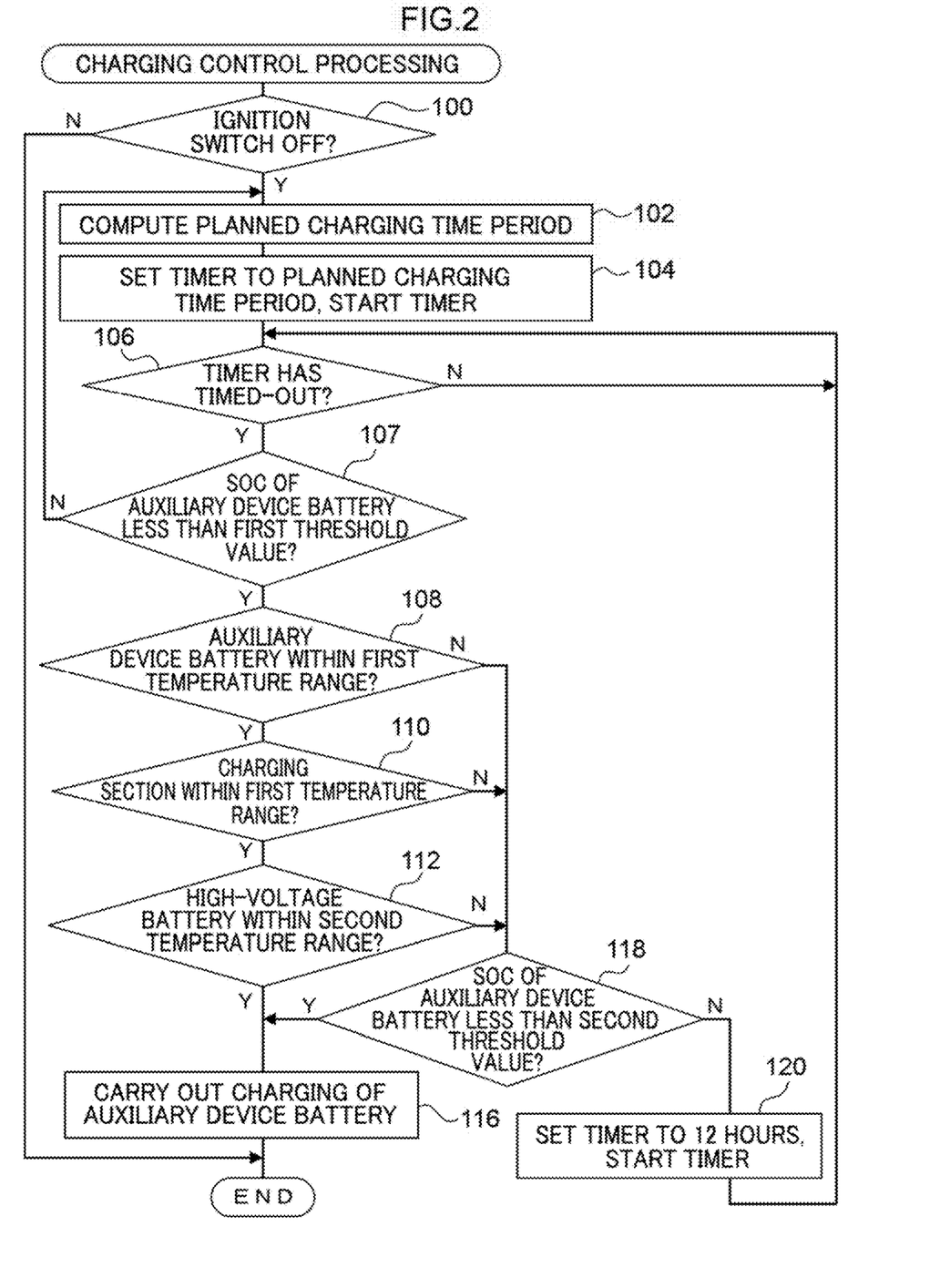
FIG. 2 is a flowchart of charging control processing relating to the first exemplary embodiment.

Next, the charging control processing relating to the first exemplary embodiment is described with reference to FIG. 2 and as operation of the first exemplary embodiment. In step 100 of the charging control processing, the charging control ECU 48 determines whether or not the ignition switch of the vehicle is OFF. If the determination of step 100 is negative, the charging control processing is ended. If the determination of step 100 is affirmative, the process proceeds to step 102.

In step 102, the charging control ECU 48 acquires the SOC value of the auxiliary device battery 16 from the auxiliary device battery sensor 42, and computes, as a planned charging time period, the time period that is needed until the SOC value of the auxiliary device battery 16 falls to less than a first threshold value in a case in which the state in which the ignition switch of the vehicle is OFF continues. Note that the planned charging time period is an example of the first predetermined time period.

In step 104, the charging control ECU 48 sets a timer to the planned charging time period that was computed in step 102, and starts the timer. In step 106, the charging control ECU 48 determines whether or not the timer that was started in step 106 has timed-out. If the determination in step 106 is negative, step 106 is repeated. Due thereto, the auxiliary device battery 16 is not charged during the time period that is up until the planned charging time period that was computed in step 102 elapses.

When the timer times-out, the determination in step 106 is affirmative, and the process proceeds to step 107. In step 107, the charging control ECU 48 acquires the SOC value of the auxiliary device battery 16 from the auxiliary device battery sensor 42, and determines whether or not the SOC value of the auxiliary device battery 16 is less than the first threshold value. If the determination in step 107 is negative, it can be determined that charging of the auxiliary device battery 16 is not needed at the present point in time, and therefore, the process returns to step 102, and the processing of computing the planned charging time period and starting the timer are repeated.

On the other hand, in a case in which the SOC value of the auxiliary device battery 16 is less than the first threshold value, there is a state in which it is desirable to charge the auxiliary device battery 16. Therefore, the determination of step 107 is affirmative, and the process proceeds to step 108. In step 108, the charging control ECU 48 acquires the temperature of the auxiliary device battery 16 from the auxiliary device battery sensor 42, and determines whether or not the auxiliary device battery 16 is within a first temperature range. Note that a temperature range of the auxiliary device battery 16 and the charging section, in which efficiency of a predetermined value or greater is obtained at the time of carrying out charging of the auxiliary device battery 16, is set in advance as the first temperature range. Note that the first temperature range is an example of the predetermined first temperature range.

If the determination in step 108 is affirmative, the process proceeds to step 110. In step 110, the charging control ECU 48 acquires, from the main DDC 30, the temperature of the main DDC 30 that was detected by the temperature sensor 32, and determines whether or not the temperature of the main DDC 30, which represents the temperature of the charging section, is within the first temperature range.

If the determination of step 110 is affirmative, the process proceeds to step 112. In step 112, the charging control ECU 48 determines whether or not the high-voltage battery 14 is within a second temperature range. Note that a temperature range of the high-voltage battery 14, at which efficiency of a predetermined value or greater is obtained at the time of carrying out charging of the auxiliary device battery 16 from the high-voltage battery 14, is set in advance as the second temperature range. The second temperature range is an example of the predetermined second temperature range. Further, steps 108, 110, 112 are examples of the determination by the determination section.

In a case in which all of the determinations of steps 108, 110 and 112 are affirmative, it can be determined that there is a temperature state in which the auxiliary device battery 16 can be charged from the high-voltage battery 14 at an efficiency of a predetermined value or greater. Therefore, in a case in which the determination of step 112 is affirmative, the process proceeds to step 116. In step 116, the charging control ECU 48 causes charging from the high-voltage battery 14 to the auxiliary device battery 16 to be carried out.

Namely, during the time period until the SOC value of the auxiliary device battery 16 reaches a predetermined value (e.g., 10%), the charging control ECU 48 causes the voltage of the electric power, which is supplied from the high-voltage battery 14 via the electrical wires 18, 20, 26, 28 to the main DDC 30, to be lowered by the main DDC 30, and causes this electric power to be supplied via the electrical wire 34 to the auxiliary device battery 16. Due thereto, the auxiliary device battery 16 is charged at an efficiency of a predetermined value or greater, by electric power that is supplied from the high-voltage battery 14. Therefore, the electric power that is stored in the high-voltage battery 14 may be utilized effectively in the charging of the auxiliary device battery 16.

Figure 3:
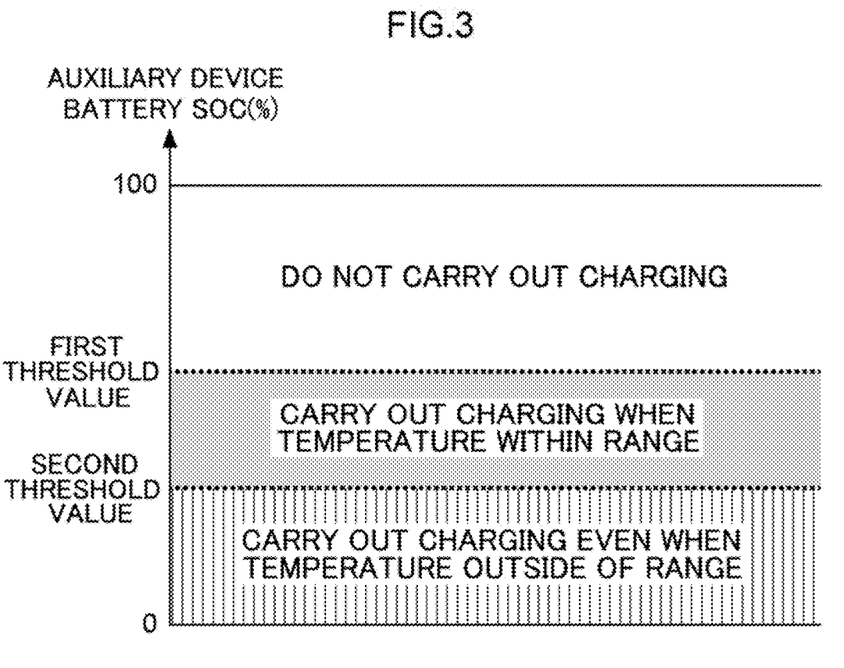
FIG. 3 is a graph showing threshold values that are compared with the SOC value of an auxiliary device battery in the charging control processing.

On the other hand, if the determinations of any of steps 108, 110, 112 are negative, it can be determined that there is a temperature state in which the efficiency when carrying out charging from the high-voltage battery 14 to the auxiliary device battery 16 will be less than a predetermined value. Therefore, in a case in which the determination of any of steps 108, 110, 112 is negative, the process proceeds to step 118. In step 118, the charging control ECU 48 acquires the SOC value of the auxiliary device battery 16 from the auxiliary device battery sensor 42, and determines whether or not the SOC value of the auxiliary device battery 16 is less than a second threshold value. Note that, as shown in FIG. 3 as well, the second threshold value is a value that is lower than the first threshold value.

If the determination in step 118 is negative, the process proceeds to step 120. In step 120, the charging control ECU 48 sets the timer to 12 hours, and starts the timer, and the process returns to step 106. Note that 12 hours is an example of a time period in which it is supposed that, accompanying a change in the air temperature arising, the auxiliary device battery 16 and the like will change to temperatures that are appropriate for charging, and is an example of the second predetermined time period.

Further, if the determination in step 118 is affirmative, in order to prioritize restoring of the SOC value of the auxiliary device battery 16 over the efficiency of charging, the process proceeds to step 116, and, as described above, charging from the high-voltage battery 14 to the auxiliary device battery 16 is made to be carried out.

In a case in which the temperature at the time of carrying out charging from the high-voltage battery 14 to the auxiliary device battery 16 is too high, the cooling system auxiliary device loads 36 and the like must be operated in order to cool the high-voltage battery and the charging section (e.g., the main DDC 30), and a large amount of electric power is needed in addition to the electric power for charging the auxiliary device battery 16, and, due thereto, the charging efficiency deteriorates. Further, in a case in which the temperature at the time of carrying out charging from the high-voltage battery 14 to the auxiliary device battery 16 is too low, the current that can be outputted from the high-voltage battery 14 is low, and the acceptability of the auxiliary device battery 16 also is low. Therefore, either it takes time to carry out charging by a small amount of current, or the batteries 14, 16 must be heated by heaters. In either case here as well, the charging efficiency deteriorates.

In contrast, in the first exemplary embodiment, it is determined whether or not the auxiliary device battery 16 is within the first temperature range, and, in a case in which it is determined that the auxiliary device battery 16 is within the first temperature range, charging from the high-voltage battery 14 to the auxiliary device battery 16 is carried out. Therefore, the efficiency of charging the auxiliary device battery 16 may be improved. Further, because the efficiency of charging the auxiliary device battery 16 may be improved, the energy saving performance of the vehicle may be improved.

Further, in the first exemplary embodiment, it is determined whether or not the auxiliary device battery 16 and the charging section (the main DDC 30 in the first exemplary embodiment) respectively are within the first temperature range, and, in a case in which it is determined that the auxiliary device battery 16 and the charging section respectively are within the first temperature range, charging of the auxiliary device battery 16 is made to be carried out. Therefore, the efficiency of charging the auxiliary device battery deteriorating due to the charging section not being within the first temperature range may be suppressed.

Further, in the first exemplary embodiment, it is also determined whether or not the high-voltage battery 14 is within the second temperature range, and, in a case in which it is determined that the high-voltage battery 14 is within the second temperature range, charging from the high-voltage battery 14 to the auxiliary device battery 16 is made to be carried out. Therefore, in a case of charging the auxiliary device battery 16 from the high-voltage battery 14, the efficiency of charging the auxiliary device battery 16 deteriorating due to the high-voltage battery 14 not being in the second temperature range may be suppressed.

In the first exemplary embodiment, in a case in which, after the ignition switch of the vehicle is turned OFF, the first predetermined time period, which is the time period until the SOC value of the auxiliary device battery 16 falls to the first threshold value or less, elapses, and the SOC value of the auxiliary device battery 16 falls to less than the first threshold value, it is determined whether or not the temperatures of the auxiliary device battery 16 and the like satisfy conditions. Therefore, charging of the auxiliary device battery 16 being carried out more frequently than needed may be suppressed.

Further, in the first exemplary embodiment, in a case in which the SOC value of the auxiliary device battery 16 is less than the first threshold value, it is determined whether the temperatures of the auxiliary device battery 16 and the like satisfy the conditions, and, in a case in which the temperatures of the auxiliary device battery 16 and the like satisfy the conditions, charging of the auxiliary device battery 16 is made to be carried out. Therefore, charging of the auxiliary device battery 16 can be made to be carried out in a state in which the auxiliary device battery 16 is an SOC value that is suited to charging.

In the first exemplary embodiment, in a case in which the SOC value of the auxiliary device battery 16 is greater than or equal to the first threshold value, the first predetermined time period, which is the time period until the SOC value of the auxiliary device battery 16 falls to less than the first threshold value, is estimated. In a case in which the first predetermined time period passes and the SOC value of the auxiliary device battery 16 is less than the first threshold value, it is determined whether the temperatures of the auxiliary device battery 16 and the like satisfy the conditions. Due thereto, charging of the auxiliary device battery 16 being made to be carried out more frequently than needed may be suppressed.

Further, in the first exemplary embodiment, in a case in which the temperatures of the auxiliary device battery 16 and the like do not satisfy the conditions, if the SOC value of the auxiliary device battery 16 is less than the second threshold value, charging of the auxiliary device battery 16 is made to be carried out. Therefore, the SOC value of the auxiliary device battery 16 may be prevented from becoming 0 or a state near 0.

In the first exemplary embodiment, in a case in which the temperatures of the auxiliary device battery 16 and the like do not satisfy the conditions, if the SOC value of the auxiliary device battery 16 is greater than or equal to the second threshold value, the determination section is made to carry out the above-described determination after the second predetermined time period elapses.

Further, in the first exemplary embodiment, in a case in which the determination of the determination section is negative, if the SOC value of the auxiliary device battery 16 is greater than or equal to the second threshold value, after the second predetermined time period elapses, it is determined whether the temperatures of the auxiliary device battery 16 and the like satisfy the conditions. Due thereto, by setting, in advance, a time period (e.g., 12 hours) over which it is supposed that a change in air temperature will arise, as the second predetermined time period, in the determination of the next time, the probability that it will be determined that the temperatures of the auxiliary device battery 16 and the like satisfy the conditions may be increased.

Second Exemplary Embodiment

A second exemplary embodiment of the present disclosure is described next. Note that, because the second exemplary embodiment has the same structure as the first exemplary embodiment, the respective portions are denoted by the same reference numerals, and description of the structures is omitted. With respect to the charging control processing relating to the second exemplary embodiment, only the portions thereof that differ from the first exemplary embodiment are described hereinafter with reference to FIG. 4.

Figure 4:
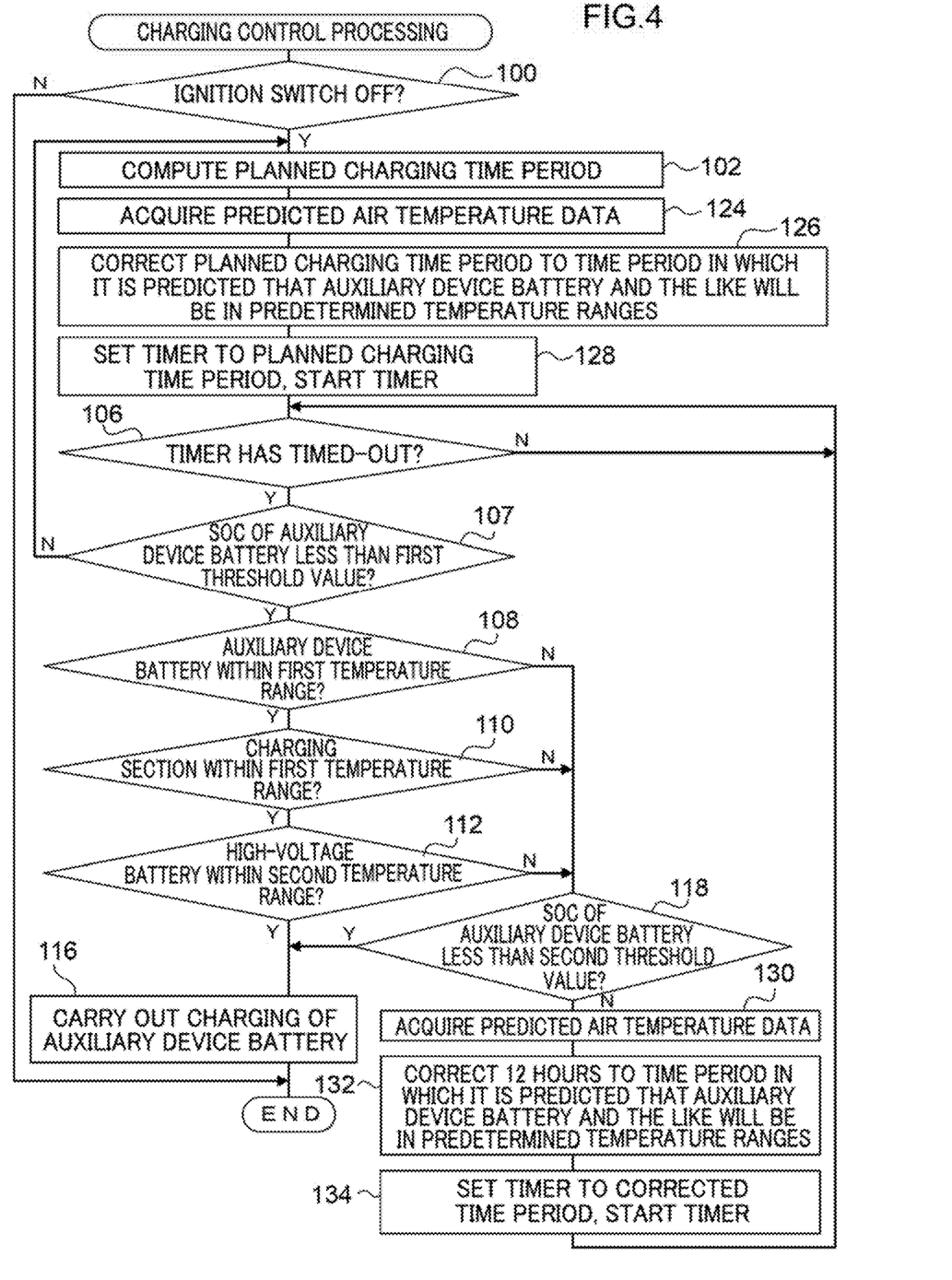
FIG. 4 is a flowchart of charging control processing relating to a second exemplary embodiment.

In the charging control processing relating to the second exemplary embodiment, the following processes are carried out instead of step 104. Namely, in step 124, the charging control ECU 48 acquires predicted air temperature data from the predicted air temperature data transmitting section 46. In step 126, on the basis of the predicted air temperature data that was acquired in step 124, the charging control ECU 48 corrects the planned charging time period that was computed in step 102 to a time period in which it is predicted that the auxiliary device battery 16 and the like will enter into predetermined temperature ranges due to the air temperature entering into a predetermined range.

As an example, the air temperature at a first time, which is the planned charging time period after the present time, is acquired from the predicted air temperature data, and it is determined whether or not the acquired air temperature is within a predetermined range. If the acquired air temperature is within the predetermined range, the planned charging time period is used as is without being corrected. On the other hand, if the acquired air temperature is not within the predetermined range, the predicted air temperature values at the first time and thereafter are acquired in order from the predicted air temperature data, and a second time at which the predicted air temperature value will enter into the predetermined range is discriminated. Then, the planned charging time period is corrected by adding the time difference between the first time and the second time to the planned charging time period.

planned charging time period←planned charging time period+(second time−first time)

There is a time lag $\Delta t$ from the time that the air temperature changes until the time that the temperature of the auxiliary device battery 16 changes in accordance with this change in the air temperature. Therefore, the planned charging time period may be corrected by also including this time lag $\Delta t$.

planned charging time period←planned charging time period+(second time−first time)+time lag $\Delta t$ In next step 128, the charging control ECU 48 sets the timer to the planned charging time period that was obtained through the processing of step 126, and starts the timer. Due to the above-described processing, at the point in time when the timer which was started in step 128 times-out, the probability of it being determined that the temperatures of the auxiliary device battery 16 and the like satisfy the conditions may be improved.

Further, in the charging control processing relating to the second exemplary embodiment, the following processes are carried out in place of step 120. Namely, in step 130, the charging control ECU 48 acquires predicted air temperature data from the predicted air temperature data transmitting section 46. In step 132, on the basis of the predicted air temperature data that was acquired in step 130, the charging control ECU 48 corrects the 12 hours that is the example of the second predetermined time period to a time period in which it is predicted that the auxiliary device battery 16 and the like will enter into predetermined temperature ranges due to the air temperature entering into a predetermined range, in the same way as in above-described step 126.

In step 134, the charging control ECU 48 sets the timer to the corrected time period, and starts the timer. Due to the above-described processes, at the point in time when the timer that was started in step 134 times-out, the probability that it will be determined that the temperatures of the auxiliary device battery 16 and the like satisfy the conditions may be improved.

Third Exemplary Embodiment

A third exemplary embodiment of the present disclosure is described next. Note that portions that are the same as those of the first exemplary embodiment and the second exemplary embodiment are denoted by the same reference numerals, and description thereof is omitted.

Figure 5:
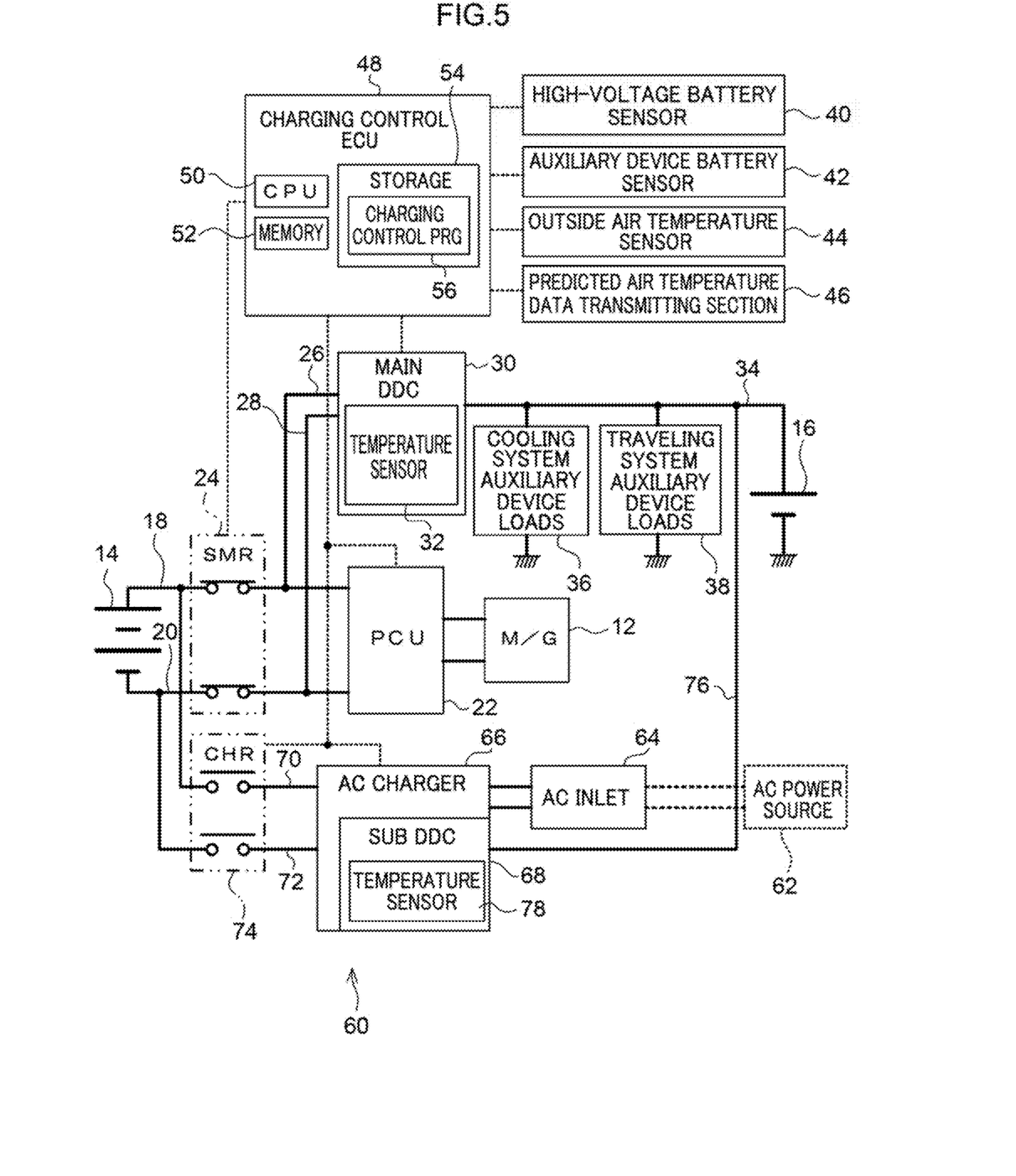
FIG. 5 is a schematic structural drawing of an onboard system relating to a third exemplary embodiment.

As shown in FIG. 5, a vehicle, in which an onboard system 60 relating to the third exemplary embodiment is installed, is a so-called plug-in hybrid vehicle in which charging from an AC power source 62 to the high-voltage battery 14 and the like is possible. Namely, the onboard system 60 includes an AC inlet 64 that is connected to the AC power source 62 when charging from the AC power source 62 is carried out. The AC inlet 64 is connected to an AC charger 66.

The AC charger 66 has an AC/DC converter built therein. One ends of electrical wires 70, 72 are connected to the AC charger 66. The other ends of the electrical wires 70, 72 are connected to portions, which are between the SMR 24 and the high-voltage battery 14, of the electrical wires 18, 20. Further, a charge relay (hereinafter called "CHR") 74 is provided on the electrical wires 70, 72. The AC charger 66 and the CHR 74 are connected to the charging control ECU 48, and operation thereof is controlled by the charging control ECU 48. The CHR 74 is turned ON in a case in which the high-voltage battery 14 is charged by electric power supplied from the AC power source 62.

The AC charger 66 includes a sub DC/DC converter (hereinafter called "sub DDC") 68 that lowers the voltage of the DC electric power outputted from the AC/DC converter. The sub DDC 68 has built therein a temperature sensor 78 that detects the temperature of the sub DDC 68. The output end of the sub DDC 68 is connected to the electrical wire 34 via an electrical wire 76. Therefore, in the third exemplary embodiment, in the state in which the AC inlet 64 is connected to the AC power source 62, the auxiliary device battery 16 can be charged due to electric power, whose voltage has been lowered, being supplied from the sub DDC 68 via the electrical wires 76, 34 to the auxiliary device battery 16.

Figure 6:
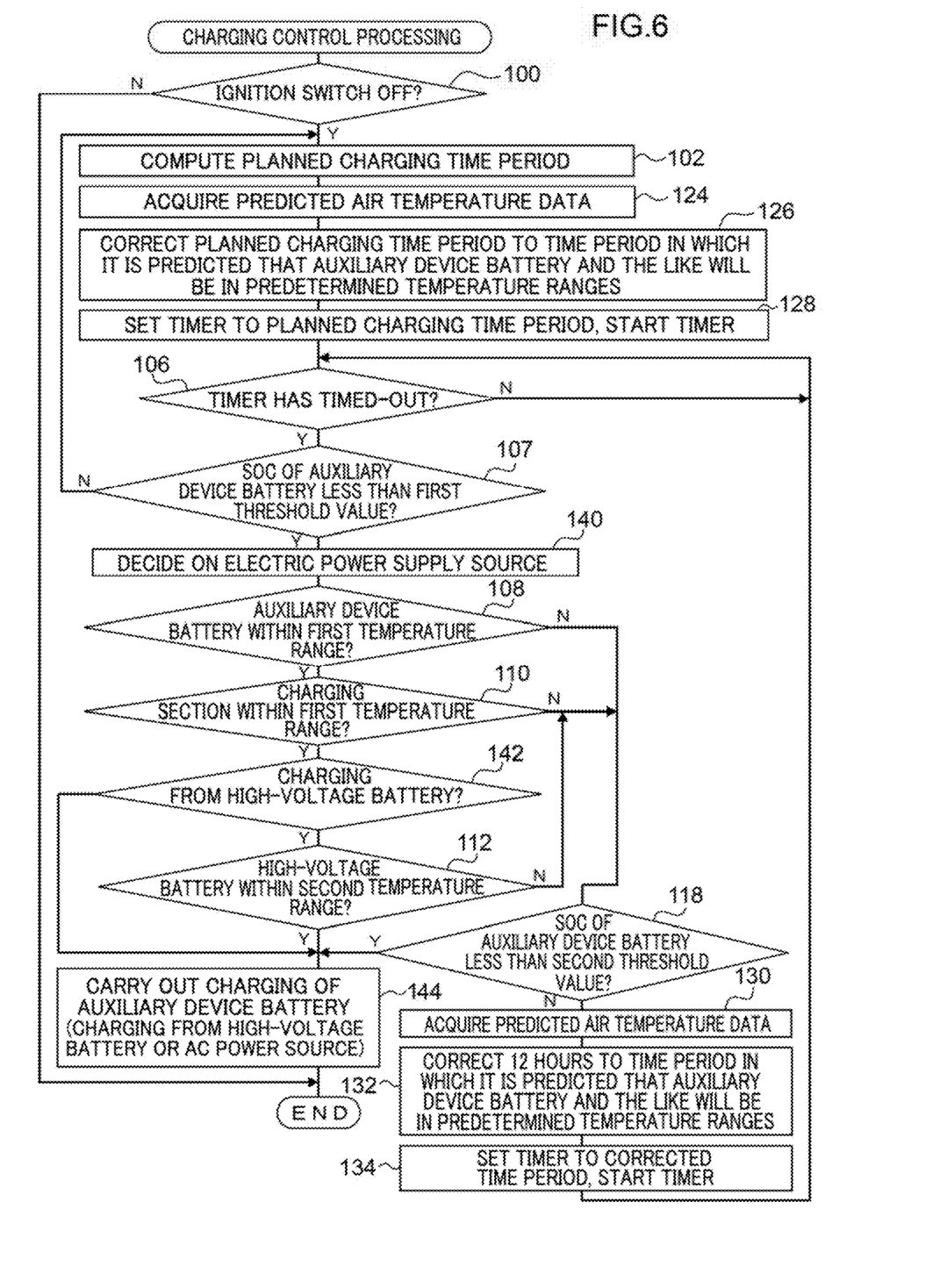
FIG. 6 is a flowchart of charging control processing relating to the third exemplary embodiment.

Only the portions, which differ from the charging control processing described in the second exemplary embodiment, of the charging control processing relating to the third exemplary embodiment are described next with reference to FIG. 6.

In the third exemplary embodiment, after the determination in step 106 becomes affirmative due to the timer timing-out, when the determination of step 107 is affirmative due to the SOC value of the auxiliary device battery 16 being less than the first threshold value, the process proceeds to step 140. In step 140, on the basis of whether or not the AC inlet 64 is connected to the AC power source 62, the charging control ECU 48 decides whether the source of the supply of electric power for charging the auxiliary device battery 16 is to be the AC power source 62 or the high-voltage battery 14.

Further, in the third exemplary embodiment, in step 110, in a case in which the source of the supply of charging electric power to the auxiliary device battery 16 is the AC power source 62, the charging control ECU 48 acquires, from the sub DDC 68, the temperature of the sub DDC 68 that was detected by the temperature sensor 78, and determines whether or not the sub DDC 68 is within the first temperature range. Further, in a case in which the source of the supply of charging electric power to the auxiliary device battery 16 is the high-voltage battery 14, the charging control ECU 48 acquires, from the main DDC 30, the temperature of the main DDC 30 that was detected by the temperature sensor 32, and determines whether or not the main DDC 30 is within the first temperature range.

In the third exemplary embodiment, if the determination in step 110 is affirmative, the process proceeds to step 142. In step 142, the charging control ECU 48 determines whether or not the source of the supply of charging electric power to the auxiliary device battery 16 is the high-voltage battery 14. If the determination in step 142 is affirmative, the process proceeds to step 112, and the temperature of the high-voltage battery 14 is determined. However, if the determination of step 142 is negative, step 112 is skipped, and the process proceeds to step 144 without determination the temperature of the high-voltage battery 14.

Further, in the third exemplary embodiment, if the determination of step 112 is affirmative, the process proceeds to step 144. In step 144, if the source of the supply of charging electric power to the auxiliary device battery 16 is the AC power source 62, the charging control ECU 48 causes charging from the AC power source 62 to the auxiliary device battery 16 to be carried out. Further, if the source of the supply of charging electric power to the auxiliary device battery 16 is the high-voltage battery 14, the charging control ECU 48 causes charging from the high-voltage battery 14 to the auxiliary device battery 16 to be carried out. Note that the carrying out of the charging from the AC power source 62 to the auxiliary device battery 16 can be realized by electric power being supplied from the AC power source 62 by the path of the AC inlet 64, the AC charger 66 (the sub DDC 68), the electrical wires 76, 34, and the auxiliary device battery 16.

In this way, the source of the supply of charging electric power to the auxiliary device battery 16 is not limited to the high-voltage battery 14. In a case in which the AC inlet 64 is connected to the AC power source 62, the AC power source 62 can be used as the source of the supply of charging electric power to the auxiliary device battery 16. Further, in a case in which the AC power source 62 is used as the source of the supply of charging electric power to the auxiliary device battery 16, charging of the auxiliary device battery 16 can be carried out regardless of the temperature of the high-voltage battery 14.

Note that the third exemplary embodiment describes a form in which the sub DDC 68 is provided at the AC charger 66, but, depending on the vehicle, there are also cases in which the sub DDC 68 is omitted. In such a case, charging of the auxiliary device battery 16 can be carried out by turning the CHR 74 and the SMR 24 on, and supplying electric power from the AC power source 62 by the path of the AC inlet 64, the AC charger 66, the electrical wires 70, 72, 18, 20, 26, 28, the main DDC 30, the electrical wire 34, and the auxiliary device battery 16.

Further, although the above describes forms in which the temperature of the main DDC 30 (or the sub DDC 68) is used as the temperature of the charging section, the present disclosure is not limited to this, and the temperature of an electrical wire on the supply path of electric power at the time of charging the auxiliary device battery 16 may be used.

Further, the above describes a form in which, at the time of charging the auxiliary device battery 16, it is determined whether or not the charging section (the main DDC 30 and the like) is within the first temperature range. However, the temperature of the charging section affects the efficiency of charging the auxiliary device battery 16 less than the temperatures of the batteries 16, 14 do. Therefore, it is not essential to determine whether or not the charging section is within the first temperature range, and this determination may be omitted.

Further, although the above describes a form in which the present disclosure is applied to a hybrid vehicle, the present disclosure is not limited to this. The present disclosure may be applied provided that the vehicle is equipped with the auxiliary device battery 16 that supplies electric power to auxiliary devices of the vehicle, a charging section that charges the auxiliary device battery 16, and the high-voltage battery 14 that is higher voltage than the auxiliary device battery 16. The present disclosure may be applied to a vehicle such as an electric automobile or the like that does not have an engine or the like.

What is claimed is:

1. A charging control device comprising:
    a processor programmed to:
        compute a time point when a charged amount of an auxiliary device battery that supplies electric power to auxiliary devices of a vehicle will become less than a first threshold value;
        set a first time period which ends at the computed time point;
        in a case in which the first time period has elapsed after an ignition switch of the vehicle is turned OFF, and the charged amount of the auxiliary device battery is less than the first threshold value, determine whether the auxiliary device battery and a charger that charges the auxiliary device battery are respectively within a first temperature range; and
        in a case in which the auxiliary device battery and the charger are within the first temperature range, cause the charger to charge the auxiliary device battery.

2. The charging control device of claim 1, wherein the processor is further programmed to:
    determine whether a high-voltage battery, which has a higher voltage than the auxiliary device battery, is within a predetermined second temperature range; and
    in a case in which it is determined at least that the auxiliary device battery and the charger are within the first temperature range, and it is determined that the high-voltage battery is within the second temperature range, cause the charger to charge from the high-voltage battery to the auxiliary device battery.

3. The charging control device of claim 1, wherein the processor is further programmed to:
    in a case in which the charged amount of the auxiliary device battery is less than the first threshold value, determine whether the auxiliary device battery and the charger are respectively within the first temperature range, and
    in a case in which the determination is affirmative, cause the charger to charge the auxiliary device battery.

4. The charging control device of claim 1, wherein the processor is further programmed to:
    in a case in which the charged amount of the auxiliary device battery is greater than or equal to the first threshold value, compute the time point and set the first time period, and
    in a case in which the first time period elapses and the charged amount of the auxiliary device battery is less than the first threshold value, determine whether the auxiliary device battery and the charger are respectively within the first temperature range.

5. The charging control device of claim 1, wherein the processor is further programmed to, in a case in which the determination is negative, and in a case in which the charged amount of the auxiliary device battery is less than a second threshold value, cause the charger to charge the auxiliary device battery.

6. The charging control device of claim 1, wherein the processor is further programmed to, in a case in which the determination is negative, and in a case in which the charged amount of the auxiliary device battery is greater than or equal to a second threshold value, determine whether the auxiliary device battery and the charger are respectively within the first temperature range after a second time period elapses.

7. The charging control device of claim 6, wherein the processor is further programmed to, based on predicted data that expresses results of prediction of a transition in air temperature, correct the first time period or the second time period to a time period in which it is predicted that the auxiliary device battery will be in the first temperature range after the first time period or the second time period.

8. A charging control method comprising, using a processor:
    computing a time point when a charged amount of an auxiliary device battery that supplies electric power to auxiliary devices of a vehicle will become less than a first threshold value;
    setting a first time period which ends at the computed time point;
    in a case in which the first time period has elapsed after an ignition switch of the vehicle is turned OFF, and the charged amount of the auxiliary device battery is less than the first threshold value, determining whether the auxiliary device battery and a charger that charges the auxiliary device battery are respectively within a first temperature range; and
    in a case in which at least that the auxiliary device battery and the charger are within the first temperature range, causing the charger to charge the auxiliary device battery.

* * * * *